United States Patent [19]

Kato et al.

[11] 4,104,247

[45] Aug. 1, 1978

[54] METHOD FOR STABILIZING AN OLEFIN POLYMER

[75] Inventors: Koich Kato; Saburo Murata, both of Yokkaichi, Japan

[73] Assignee: Mitsubishi Petrochemical Co., Ltd., Tokyo, Japan

[21] Appl. No.: 785,152

[22] Filed: Apr. 6, 1977

[30] Foreign Application Priority Data

Apr. 6, 1976 [JP] Japan .................................. 51-38464
Jun. 10, 1976 [JP] Japan .................................. 51-68123
Jun. 10, 1976 [JP] Japan .................................. 51-68124

[51] Int. Cl.$^2$ .......................... C08F 6/00; C08J 3/20; C08K 5/56
[52] U.S. Cl. .......................... 260/45.7 R; 260/45.8 A; 260/45.85 R; 260/45.85 E; 260/45.85 T; 260/45.85 V; 528/485; 528/491; 528/494
[58] Field of Search ................... 528/485, 491, 494; 260/45.8 A, 45.85 R, 45.85 E, 45.85 T, 45.85 V, 45.7 R

[56] References Cited

U.S. PATENT DOCUMENTS

| | | | |
|---|---|---|---|
| 2,930,783 | 3/1960 | Weber et al. | 260/93.7 |
| 3,190,852 | 6/1965 | Doyle | 260/45.85 |
| 3,226,351 | 12/1965 | Werber et al. | 260/29.6 |
| 3,236,805 | 2/1966 | Caldo | 260/45.85 |
| 3,240,750 | 3/1966 | Bonvicini | 260/45.85 |
| 3,271,339 | 9/1966 | Cappuccio et al. | 260/23 |
| 3,280,058 | 10/1968 | Caldo | 260/23 |

FOREIGN PATENT DOCUMENTS 832,996 4/1960 United Kingdom ................... 528/485

*Primary Examiner*—Stanford M. Levin
*Attorney, Agent, or Firm*—Sughrue, Rothwell, Mion, Zinn and Macpeak

[57] ABSTRACT

A method for stabilizing an olefin polymer which comprises treating an olefin polymer containing residual catalyst with at least one treating agent selected from the group consisting of an ester of a monohydric alcohol, a dioxane compound and an aluminic ester compound thereby to improve the color of the olefin polymer, the olefin polymer being obtained by polymerizing olefins in the presence of a Ziegler type catalyst.

15 Claims, No Drawings

METHOD FOR STABILIZING AN OLEFIN POLYMER

BACKGROUND OF THE INVENTION

1. Field of the Invention

The present invention relates to a stabilization method for olefin polymers. More particularly, the present invention relates to a method for stabilizing olefin polymers which comprises treating olefin polymers with a specific treating agent, the olefin polymers being obtained by polymerization of olefins in the presence of a catalyst containing a compound of a transition metal of Groups IVa to VIa of the Periodic Table and a hydride or an organic compound of a metal of Groups II to III of the Periodic Table, i.e., a Ziegler type catalyst.

2. Description of the Prior Art

The physical properties of olefin polymers which are obtained by olymerizing olefins such as ethylene, propylene or the like using a Ziegler type catalyst are deteriorated by light or heat. In order to prevent this deterioration, a stabilizer (e.g., a heat stabilizer, an ultraviolet absorbent, etc.) is added to the polymer prior to a step such as a granulation step in which the polymer is to be heated, as described in, for example, British Pat. No. 980,468.

However, some catalyst which uwas used for the polymerization is retained in the polymers (for brevity, hereinafter merely referred to as "residual catalyst"), and the residual catalyst in combination with a stabilizer causes a deterioration of the quality of the olefin polymers, such as discoloration, thermal deterioration, bad smell or the like, to occur.

Therefore, olefin polymers containing residual catalyst are generally neutralized with an alkali immediately after polymerization and washed with a large amount of an alcohol or water thereby to sufficiently dissolve and remove the residual catalyst in the polymers followed by addition of a stabilizer thereto as described in, for example, U.S. Pat. No. 3,644,321.

However, such a removal operation of the residual catalyst is extremely complicated, and in practice industrially, the cost of this treatment step is expensive, which is remarkably disadvanageous from the economical standpoint. Therefore, the development of a simpler and cheaper treatment method for removal of the residual catalyst is desired.

As a result, various methods for stabilizing olefin polymers containing residual catalyst without removing the residual catalyst from the olefin polymers have been proposed. For example, methods for contacting the olefin polymers with an epoxy group-containing compound, a hydroxy group-containing organic compound, an alkyl ester of a carboxylic acid or the like, oxygen or steam as described in Japanese Patent Publication No. 38035/75, or a method for treating the olefin polymers with an ester of phosphoric acid (as described in Japanese Patent Publications Nos. 38035/74 and 26/66), an ester of silicic acid (as described in Japanese Patent Publication No. 18460/74 or an ester of boric acid (as described in Japanese Patent Publication Nos. 38035/74 and 26/66) are known.

However, the degree of color improvement of the olefin polymers using the above-described material is poor, and the above-described methods can not be satisfactorily used on an industrial scale.

As a result of extensive investigations on obtaining olefin polymers for which an operation for removal of the polymerization catalyst residues is not required, a discoloration, even if the polymers are subjected to a treatment step involving heating such as granulation, does not occur, and the physical properties of the polymers are not deteriorated (e.g., a cleaving of the high molecular chains by oxidation, heating, etc.), it was found that olefin polymers can be stabilized by treating the same with a specific compound and the present invention was accomplished.

SUMMARY OF THE INVENTION

Accordingly, an object of the present invention is to provide a method for stabilizing an olefin polymer which comprises treating the olefin polymer with at least one treating agent selected from the group consisting of an ester of a monohydric alcohol, a dioxane compound and an aluminic ester.

Another object of the present invention is to provide a method for rendering the residual catalyst inert which comprises treating an olefin polymer with the above-described treating agent when the catalyst already used for polymerization is retained in the olefin polymer.

DETAILED DESCRIPTION OF THE INVENTION

Olefin polymers which can be stabilized in the present invention are those olefin polymers which are solid at normal temperature (e.g., about 20° to 30° C) and normal pressure (e.g. about 1 atm) and are obtained by polymerization of olefins with 2 to 7 carbon atoms such as ethylene, propylene, butene-1, pentene-1, 3-methyl butene-1, hexene-1, 4-methyl pentene-1, hexene-1 and the like in the presence of a Ziegler type catalyst, that is, a catalyst comprising a compound of a transition metal of Groups IVa to VIa of the Periodic Table and an organic compound of a metal of Groups II to III of the Periodic Table, preferably a catalyst comprising a titanium halide (specifically, titanium tri- or tetrachloride) and an organoaluminum compound (specifically, a dialkylaluminum monochloride or a trialkylaluminum).

The titanium halide may be used in a form that it is supported on an inorganic carrier (e.g., magnesium chloride) or it is further treated with an electron donor or a complexing agent (e.g., an ester of an organic acid or an ether).

More specifically, this invention can be suitably employed for olefin polymers or copolymers the yield of which in terms of amount in grams of the polymer per gram of the transition metal component of the catalyst (e.g. titanium) is at least about 2,000 preferably above 4,000, more preferably above 100,000 and most preferably above 1,000,000 as described in, for example, Japanese Patent Publication No. 46269/72, Japanese Patent Application (OPI) No. 34478/72, Japanese Patent Application (OPI) No. 86482/74, Japanese Patent Application (OPI) No. 108385/75, Japanese Patent Application (OPI) No. 15497/77 and Japanese Patent Application (OPI) No. 120634/75, and in the absence of or presence of an inert hydrocarbon solvent such as hexane or heptane. In general, the invention is applicable to polymers containing the transition metal catalyst component in a concentration of from about 1 to about 200 ppm, preferably from about 10 to about 100 ppm, based on the weight of the polymers.

Examples of olefin polymers containing residual catalyst to which the invention is applicable are polyethylene (e.g., having a molecular weight of about 1,000 to about 500,000), polypropylene (e.g., having a molecular weight of about 100,000 to about 800,000), an ethylene-propylene copolymer or the like. Of these, the invention is in particular appropriate for a homopolymer or a copolymer of propylene such as polypropylene, an ethylene-propylene copolymer (ethylene content: 15 wt% or less) or the like. In general, these polymers or copolymers when subjected to the process of this invention are in a semi-crystalline state.

The olefin polymers are generally treated with a treating agent as defined in the present invention without a residual catalyst removal treatment, but optionally (for example, where the residual catalyst content is high), the olefin polymers are first subjected to a simple residual catalyst removal treatment by, for example, water washing to reduce the residual catalyst content in the polymer, and then treating the polymers with the treating agent of the present invention. Specifically, where the amount of residual catalyst in the polymers produced exceeds 200 ppm, it is preferred to previously reduce the amount of residual catalyst by such a treatment.

The treating agent which can be used in the present invention is selected from the following compounds (1) to (3). These compounds can be used individually or as mixtures thereof.

(1) Esters of Monohydric Alcohols

The ester of a monohydric alcohol is obtained by esterification of a monohydric lower alcohol with a lower carboxylic acid.

Preferred monohydric lower alcohols are those having 1 to 12 carbon atoms. Specifically prefered monohydric lower alcohols are aliphatic monohydric alcohols having 1 to 6 carbon atoms. Representative examples of monohydric lower alcohol include methyl alcohol, ethyl alcohol, n- or iso-propyl alcohol, n-, iso-, sec- or tert-butyl alcohol, pentyl alcohol, hexyl alcohol, or the like.

Preferred lower carboxylic acids are those having 1 to 12 carbon atoms. More preferred lower carboxylic acids include aliphatic monocarboxylic acids having 1 to 6 carbon atoms, such as formic acid, acetic acid, propionic acid, butyric acid, acrylic acid or the like; aliphatic polycarboxylic acids having 1 to 6 carbon atoms, such as oxalic acid, malonic acid, succinic acid, glutaric acid, citric acid or the like; aromatic carboxylic acids having 1 to 6, preferably 1 to 2, carbon atoms in the carboxyl group containing moiety which is bonded to an aromatic ring, such as benzoic acid, phenylacetic acid or the like; etc.

Representative examples of suitable monohydric alcohol ester compounds include methyl formate, propyl formate, methyl acetate, ethyl acetate, propyl acetate, butyl acetate, amyl acetate, isoamyl acetate, cyclohexyl acetate, methyl propionate, ethyl propionate, butyl propionate, methyl butyrate, butyl butyrate, methyl acrylate, ethyl acrylate, butyl acrylate, dimethyl oxalate, diethyl oxalate, dibutyl oxalate, diethyl malonate, dimethyl succinate, diethyl succinate, diethyl glutarate, ethyl citrate, methyl benzoate, ethyl benzoate, ethylphenyl acetate, or the like. Of these compounds preferred esters are those obtained by esterification of a monocarboxylic acid having 1 to 3 carbon atoms with an aliphatic monohydric alcohol having 1 to 5 carbon atoms, more specifically, ethyl acetate, butyl acetate, isoamyl propionate or the like.

These esters can be used individually or as mixtures thereof.

(2) Dioxane compounds

Dioxane compounds which can be used in the present invention include dioxane or an alkyl dioxane having 1 to 6 carbon atoms in the alkyl moiety thereof, such as monoalkyl dioxane, dialkyl dioxane or the like. Representative examples of dioxane compounds include 1,3-dioxane, 1,4-dioxane, 2-methyl-1,3-dioxane, 4-methyl-1,3-dioxane, 5-methyl-1,3-dioxane, 6-methyl-1,3-dioxane, 2-ethyl-1,3-dioxane, 4-ethyl-1,3-dioxane, 5-propyl-1,3-dioxane, 4-propyl-1,3-dioxane, 2-butyl-1,3-dioxane, 4-hexyl-1,3-dioxane, 2-dimethyl-1,3-dioxane, 4-dimethyl-1,3-dioxane, 2-diethyl-1,3-dioxane, 5-diethyl-1,3-dioxane, 2,4-dimethyl-1,3-dioxane, 2-methyl-1,4-dioxane, 3-methyl-1,4-dioxane, 2-ethyl-1,4-dioxane, 3-ethyl-1,4-dioxane, 2-propyl-1,4-dioxane, 3-butyl-1,4-dioxane, 2-pentyl-1,4-dioxane, 2-hexyl-1,4-dioxane, 2-dimethyl-1,4-dioxane, 3-dimethyl-1,4-dioxane, 2-diethyl-1,4-dioxane, 3-diethyl-1,4-dioxane, or the like. Of these compounds, dioxane is specifically preferred. These compounds can be used individually or as mixtures thereof.

(3) Aluminic esters

Aluminic esters which can be used in the present invention include alkylaluminum alkoxide represented by the chemical formula: $Al(OR)_3$ or $RAl(OR)_2$, wherein R is a hydrocarbon group having 1 to 20 carbon atoms such as an alkyl group, an aryl group or the like, preferably an alkyl group having 1 to 6 carbon atoms. Representative examples of alkyl groups for R include methyl, ethyl, n-, or iso-propyl, n-, sec-, tert-, or iso-butyl, pentyl, hexyl groups or the like, and representative examples of the aryl groups for R include phenyl, tolyl groups or the like. The preferred OR group is a lower alkoxy group having 1 to 6 carbon atoms, such as a methoxy group, an ethoxy group, a propoxy group, a butoxy group or the like.

Representative examples of aluminum alkoxides include aluminum trialkoxides such as aluminum trimethoxide, aluminum triethoxide, aluminum tri-n-propoxide, aluminum tri-iso-propoxide, aluminum tri-n-butoxide, aluminum tri-tert-butoxide, aluminum trioctoxide or the like; aluminum dialkoxides such as methyl aluminum dimethoxide, methylaluminum diethoxide, methyl aluminum dipropoxide, methyl aluminum dibutoxide, methyl aluminum dipentoxide, methyl aluminum dihexoxide, ethyl aluminum dimethoxide, ethyl aluminum diethoxide, ethyl aluminum dibutoxide, propyl aluminum dimethoxide, propyl aluminum dipropoxide, propyl aluminum dihexoxide, or the like; etc. Aluminum trialkoxides such as aluminum trimethoxide, aluminum triethoxide, aluminum tri-iso-propoxide, aluminum tri-tert-butoxide or the like are specifically preferred. Those aluminum alkoxides can be used individually or as mixtures thereof.

Since these aluminic esters are solid at normal temperature, they are generally used in a molten state under heating or by dissolving in a solvent.

Examples of suitable solvents for the aluminic esters include ethanol, isopropanol, benzene, toluene, chloroform, carbon tetrachloride, petroleum hydrocarbons or the like.

To achieve the object of the present invention sufficiently, i.e., to achieve the stabilization of olefin polymers, the stabilization treatment of the olefin polymers using the treating agent is performed by sufficiently and uniformly contacting the olefin polymers and the treating agent. The above object can be achieved by melting the olefin polymers with rollers or the like and then sufficiently contacting the olefin polymers with the treating agent or by sufficiently contacting the olefin polymers in a powdery or granular form with a gaseous or liquid treating agent by stirring or in a fluidized contactor.

Treatment Temperature (1) When the olefin polymers are treated in a molten state, the treatment can be carried out at a temperature not higher than the decomposition temperature of the olefin polymers. A treatment at a temperature of from about 200° to about 270° C is specifically preferred.

Where the treating agent is solid at normal temperature as is the aluminic ester, the treating agent is pulverized to form powders, and where the treating agent is a liquid, the treating agent is used in a liquid form. The stabilization treatment is carried out by feeding powdery olefin polymers containing residual catalyst together with the above treating agent into a treating device such as an extruder and contacting the olefin polymers with the treating agent.

(2) Where the polymers are in a powdery or granular state, the treatment temperature must be not higher than the softening point of the olefin polymers, and also the treating agent must be present in a state such that the treating agent can be brought into contact with the olefin polymers in a freely fluidized condition, e.g., in a tank equipped with a stirring means (for brevity, hereinafter merely referred to as "a stirring tank") or a fluidized contactor, as in a gaseous or liquid state. Therefore, a solid treating agent is not preferred. Further, it is better for the treating agent to be heated so as to achieve a sufficient stabilization effect on contact with the catalyst. The treatment temperature preferably ranges from about 50° to about 120° C, more preferably from about 80° to about 110° C.

Specifically, in using an ester of a monohydric alcohol the treatment temperature can range from about 50° to about 120° C, preferably from about 60° to about 120° C, and in using a dioxane compound, the treatment temperature ranges from about 80° to about 120° C, preferably from about 100° to about 110° C.

Treatment Time

The treatment time will vary depending upon the manner of treatment or the like and no specific limitation exists in the treatment time if the residual catalyst in the olefin polymers can be sufficiently brought into contact with the treating agent. However, treatment time is generally from about 30 seconds to about 6 hours.

Amount of Treating Agent Used

If the treating agent is employed in an amount above about 20% by weight based on the weight of the olefin polymers, substantially no additional improvement in stabilization is observed. Therefore, the amount of the treating agent employed is generally up to about 20% by weight, preferably from about 0.01 to about 10%, most preferably from about 0.25 to about 5% by weight based on the weight of the olefin polymers.

The present invention will be illustrated in greater detail by reference to the following Examples. However, the present invention is not to be construed as being limited to these Examples only. Unless otherwise indicated herein, all parts, percents, ratios and the like are by weight.

EXAMPLE 1

Synthesis of Titanium Trichloride Catalyst Component

Into a 500 ml four-necked flask equiped with a stirring means, the air in which had been replaced with argon, were charged 28.1 g of anhydrous aluminum chloride which was sublimed for purification and pulverized and 200 ml of dried methyl cyclohexane. 30.0 g of ethylaluminum sesquichloride was further added to the system and the system was heated to 100° C with stirring to dissolve the aluminum chloride and to form a uniform solution. The apparent composition of the organoaluminum compound produced was $AlEt_{0.8}Cl_{2.2}$, where Et represents $C_2H_5$.

34.5 g of titanium tetrachloride was diluted with 60 ml of methyl cyclohexane, and the resulting solution was added dropwise to the system with a dropping funnel over a 1 hour period to conduct a reduction. After completion of the reaction, the stirring was immediately stopped and the supernatant was removed. 100 ml of methyl cyclohexane was added to wash the reaction mixture. This washing operation was repeated 5 times. The reaction mixture was vacuum dried to obtain 53 g of a violet titanium trichloride composition.

As the result of analyzing the catalyst composition, the molar ratio of $TiCl_3/AlCl_3$ was found to be 1.26. Further, as a result of X-ray diffraction analysis using CuKα ray, a peak was observed at 15.1° and no peak was observed in the vicinity of 16°. Further, from the fact that a single peak was observed in the vicinity of 52.3°, the product was confirmed not to be the β type and to have a structure similar to the γ type and aluminum was completely dissolved in the crystal lattice to form a solid solution.

The product was transfrerred into a pot of a 1 liter vibration mill and pulverized for 48 hours.

After completion of the pulverization, 15 g of the titanium trichloride composition was charged into a 200 ml four-necked flask. After charging 50 ml of dried n-hexane to the flask followed by stirring to disperse the titanium trichloride composition therein, 12.3 g of isoamyl ether was further added and the temperature of the system was increased to 35° C and the reaction was conducted for 2 hours. After completion of the reaction, the supernatant was removed and the reaction mixture was washed 5 times with 100 ml of n-hexane to obtain a solid product with a violet color 25 ml of n-hexane was added and then 25.9 g of titanium tetrachloride was added, and the temperature of the system was increased to 65° C while stirring and the reaction was conducted for 2 hours. After completion of the reaction, the supernatant was removed, and the reaction mixture was washed 5 times with 100 ml of n-hexane followed by vacuum drying to obtain 7 g of a modified titanium trichloride catalyst. The specific surface area of the modified titanium trichloride was 170 m²/g, the Al/Ti molar ratio was 0.03:1 and the cocrystallized aluminum chloride was almost completely eluted.

Polymerization

After drying a 3 l stirring type stainless steel autoclave and replacing the air in the autoclave with nitrogen gas, 2 l of liquid propylene and 1 l of hydrogen (under normal pressure e.g., about 1 atmosphere) were added and 20 ml of an n-heptane slurry containing 0.03 g of the modified titanium trichloride composition obtained above and 0.15 g of diethylaluminum chloride was further added, and the temperature of the system was increased to 70° C and polymerization was conducted for 3 hours. After completion of the polymerization, unreacted propylene was removed by evaporation to obtain 300 g of powdery polypropylene having a particle size of 100 to 700 microns (residual Ti content: about 30 ppm).

Stabilization 100 g of powdery polypropylene obtained as described above was introduced into a 0.5 l glass stirring tank equipped with a heating means and filled with nitrogen gas. 1.2 ml of ethyl acetate was then added, and the system was heated to 80° C and stirred for 60 minutes to sufficiently contact gaseous ethyl acetate and powdery polypropylene.

Stability Measurement

The powdery polypropylene thus treated was dried at 60° C under vacuum for 1 hour. A stabilizer which is used as an anti-oxidant and a neutralizing agent (0.1 wt% of 2,6-di-t-butyl-p-cresol; 0.15 wt% of di-tetradecyl-3,3-thiodipropionate; 0.05 wt% of calcium stearate; and 0.04 wt% of 1,1,3-tris (2-methyl-4-hydroxy-5-t-butylphenyl)butane was blended with the dried powdery polyolefin, and the resulting blend was formed into a press sheet having a thickness of 2 mm at 230° C. The color (b-value) of the sheet was measured with a Color Machine ("CM-20", manufactured by Japan Color Machine Co.).

The results obtained are shown in Table 1 below.

EXAMPLE 2

After blending the same stabilizer as described in Example 1 (antioxidant and neutralizing agent) with 300 g of powdery polypropylene obtained using the same polymerization operation as in Example 1, 3.6 ml of ethyl acetate was added, and the resulting mixture was melt kneaded at a compression zone temperature of 230° C and a die temperature of 220° C using a 20 mm uniaxial extruder (manufactured by Thermoplastic Co.; length of screw/diameter of screw=20, rotation rate of screw=95 rpm) and passed through the extruder over a 1 minute period to obtain pellets.

The pellets were formed into a press sheet having a thickness of 2 mm at 230° C, and the color (b-value) of the sheet was measured in the same manner as in Example 1.

The results obtained are shown in Table 1 below.

EXAMPLES 3–7

The procedures as in Example 2 were repeated except that an ester as shown in Table 1 below was used instead of 3.6 ml of ethyl acetate.

The results obtained are shown in Table 1 below.

REFERENCE EXAMPLE

The same procedures as in Example 2 were repeated except that no ester was added.

The results obtained are shown in Table 1 below.

COMPARATIVE EXAMPLES 1–3

The same procedures as in Example 2 were repeated except that acetic acid, ethyl alcohol and a mixture thereof were each used instead of ethyl acetate.

The results obtained are shown in Table 1 below.

Table 1

| Example No. | Olefin Polymer Kind | Amount (g) | Treating Agent Kind | Amount (ml) | Treating Device | Coloration b-Value | Color |
|---|---|---|---|---|---|---|---|
| Reference Example | Polypropylene | 300 | None | — | Extruder | 6.5 | Yellow |
| Example 1 | " | 100 | Ethyl acetate | 1.2 | Powder stirring tank | 4.5 | Almost colorless |
| " 2 | " | 300 | " | 3.6 | Extruder | 4.5 | " |
| " 3 | " | 300 | Butyl acetate | 4.8 | " | 4.7 | Slightly colored |
| " 4 | " | 300 | Cyclohexyl acetate | 5.3 | " | 4.9 | " |
| " 5 | " | 300 | Isoamyl propionate | 4.5 | " | 4.5 | Almost colorless |
| " 6 | " | 300 | Ethyl acrylate | 4.3 | " | 4.8 | Slightly colored |
| " 7 | " | 300 | Methyl benzoate | 4.4 | " | 4.9 | " |
| Comparative Example 1 | " | 300 | Acetic acid | 2.1 | " | 7.0 | Brown |
| " 2 | " | 300 | Ethyl alcohol | 2.1 | " | 6.0 | Yellow |
| " 3 | " | 300 | Mixture of acetic acid and ethanol (1:1 by volume) | 4.2 | " | 8.0 | Brown |

EXAMPLE 8

300 g of powdery polypropylene obtained using the same polymerization as in Example 1 was introduced into a 3 l glass stirring tank equipped with a heating means and filled with nitrogen gas. 6 g of 1,4-dioxane was added and the system was heated to 102° C and stirred for 60 minutes to sufficiently contact the gaseous dioxane and the powdery polypropylene.

A press sheet of the polymer was prepared in the same manner as in Example 1 and the color of the sheet was measured in the same manner as in Example 1.

The results obtained are shown in Table 2 below.

EXAMPLE 9

The same procedures as in Example 2 were repeated except that 6.0 g of 1,4-dioxane was added instead of 3.6 ml of ethyl acetate to obtain a press sheet having a thickness of 2 mm. The color of the sheet was measured in the same manner as in Example 1.

The results obtained are shown in Table 2 below.

EXAMPLES 10-11

The same procedures as in Example 9 were repeated except that the amount of dioxane was changed to 0.75 g and 3 g.

The results obtained are shown in Table 2 below.

EXAMPLES 12-13

The same procedures as in Example 9 were repeated except that methyl dioxane and dimethyl dioxane were used instead of dioxane.

The results obtained are shown in Table 2 below.

COMPARATIVE EXAMPLES 4-5

The same procedures as in Example 9 were repeated except that 1,3-dioxolane and propylene oxide were used instead of 1,4-dioxane.

The results obtained are shown in Table 2 below.

butoxide were used instead of aluminum triisopropoxide.

The results obtained are shown in Table 3 below.

COMPARATIVE EXAMPLES 6-8

The same procedures as in Example 14 were repeated except that trioctyl phosphite, trimethoxy methylsilane and trimethyl borate were used instead of aluminum triisopropoxide.

The results obtained are shown in Table 3 below.

Table 3

| Example No. | | Olefin Polymer | | Treating Agent | | Treating Device | Coloration | |
|---|---|---|---|---|---|---|---|---|
| | | Kind | Amount (g) | Kind | Amount (g) | | b-Value | Color |
| Reference Example | | Polypropylene | 300 | None | — | Extruder | 6.5 | Yellowish brown |
| Example | 14 | " | 300 | Aluminum tri-isopropoxide | 6 | " | 4.2 | Colorless |
| " | 15 | " | 300 | " | 0.75 | " | 4.7 | Slightly colored |
| " | 16 | " | 300 | " | 3 | " | 4.2 | Colorless |
| " | 17 | " | 300 | Aluminum triethoxide | 6 | " | 4.8 | Slightly colored |
| " | 18 | " | 300 | " | 6 | " | 4.5 | Almost colorless |
| Compartive Example | 6 | " | 300 | Trioctyl phosphite | 6 | " | 6.2 | Yellowish brown |
| " | 7 | " | 300 | Trimethoxy methylsilane | 6 | " | 7.3 | Brown |
| " | 8 | " | 300 | Trimethyl borate | 6 | " | 5.5 | Slightly yellow |

EXAMPLE 19 -(1) to (3)

Synthesis of Titanium Trichloride Catalyst Component (1) Reduction of Titanium Tetrachloride Into the same type of flask as was used in Example 1 were charged 90 ml of n-hexane and 22.5 ml of titanium tetrachloride. A solution of 25.3 ml of diethylaluminum Table 2

| Example No. | | Olefin Polymer | | Treating Agent | | Treating Device | Coloration | |
|---|---|---|---|---|---|---|---|---|
| | | Kind | Amount (g) | Kind | Amount (g) | | b-Value | Color |
| Reference Example | | Polypropylene | 300 | None | — | Extruder | 6.5 | Yellowish brown |
| Example | 8 | " | 300 | 1,4-Dioxane | 6 | Powder stirring tank | 4.5 | Almost colorless |
| " | 9 | " | 300 | " | 6 | Extruder | 4.2 | Colorless |
| " | 10 | " | 300 | " | 0.75 | " | 4.5 | Almost colorless |
| " | 11 | " | 300 | " | 3 | " | 4.2 | Colorless |
| " | 12 | " | 300 | 2-Methyl-1,3-dioxane | 6 | " | 4.7 | Slightly colored |
| " | 13 | " | 300 | 2,4-Dimethyl-1,3-dioxane | 6 | " | 4.7 | " |
| Comparative Example | 4 | " | 300 | 1,3-Dioxolane | 6 | " | 8.6 | Brown |
| " | 5 | " | 300 | Propylene oxide | 6 | " | 6.0 | Yellow |

EXAMPLE 14

The same procedures as in Example 2 were repeated except that 6 g of aluminum triisopropoxide was added instead of 3.6 ml of ethyl acetate.

The results obtained are shown in Table 3 below.

EXAMPLES 15-16

The same procedures as in Example 14 were repeated except that the amount of aluminum triisopropoxide was changed to 0.75 g and 3 g respectively.

The results obtained are shown in Table 3 below.

EXAMPLES 17-18

The same procedures as in Example 14 were repeated except that aluminum triethoxide and aluminum tri-tertchloride in 75 ml of n-hexane was continuously added dropwise to the flask with a Widmer device under an argon atomosphere over a 4 hour period while maintaining the temperature of the system at 1° C. After completion of the addition, the system was stirred at the same temperature for 15 minutes. Thereafter, the system was heated to 65° C and stirred for 1 hour to complete the reaction.

After allowing the system to stand for 30 minutes, the blackish brown solid produced was washed 5 times with 100 ml of hexane (by decantation).

(2) Heat Treatment

A flask containing the blackish brown solid slurry obtained (1) above was immersed in an oil bath to remove the solvent by evaporation and a heat treatment was conducted in a pulverized state under an argon gas atmosphere at 155° C for 2 hours. At this time, the color of the solid changed from blackish brown to redish purple or dark purple.

(3) Co-pulverization Treatment of Titanium Tetrachloride 15 g of the heat treated solid obtained in (2) above and 0.83 ml of titanium tetrachloride were charged into a pot of a vibration mill under an argon gas atmosphere. The heat treated solid contained an aluminum component in an molar ratio of 0.24 based on the titanium component. Assuming that the aluminum component was $AlCl_3$, the molar ratio of $TiCl_4$ added based on the moles of $TiCl_3$ in the solid was 0.092.

The pulverization was conducted with a vibration mill under the following conditions.

| | |
|---|---|
| Inner volume of pot | 1 liter |
| Apparent volume of balls | 0.8 liter |
| Diameter of balls | 12.7 mm |
| Number of vibrations | 1410 per minute |
| Amplitude of vibrations | 3.5 mm |
| Pulverization time | 48 hours (at room temperature) |

(4) Complexation Treatment

After confirming by X-ray diffraction analysis that no β-type titanium trichloride was present in the pulverized product obtained in (3) above, a complexation treatment was conducted using 10 g of the solid sample. The complexation treatment was conducted at 35° C for 2 hours by suspending 10 g of the solid sample in 50 ml of hexane and using 16.2 ml of isoamyl ether (isoamyl ether/$TiCl_3$ molar ratio = 1.49).

After completion of the reaction, the system was allowed to stand for 1 hour and the contents were washed 5 times with 100 ml of hexane (by decantation).

(5) Lewis Acid Treatment

After discharging almost all of the supernatant of the solid slurry obtained in (4) above, 30 ml of hexane and 20 ml of titanium tetrachloride ($TiCl_4$ = 40% by volume) were added and the system was stirred at 55° C for 2 hours to sufficiently contact the $TiCl_4$ solution and the solid component.

After completion of the treatment, the solid component was again washed 5 times with 50 ml of hexane by decantation and then the solvent was removed by vacuum evaporation to obtain a powdery titanium trichloride composition, i.e., titanium trichloride catalyst component.

Polymerization

After drying a 3 l stirring type stainless steel autoclave and replacing the air therein with nitrogen gas, 2 l of liquid propylene and 1 l of hydrogen (under normal pressure) were added to the autoclave and then 20 ml of an n-heptane slurry containing 0.03 g of the titanium trichloride composition obtained above and 0.15 g of diethylaluminum chloride was further added. The system was heated to 70° C and polymerization was conducted for 3 hours. After completion of the polymerization, unreacted propylene was removed by vaporization to obtain 305 g of powdery polypropylene.

Stabilization and Stability Measurement

Using 300 g of powdery polypropylene obtained above and various kinds of treating agents, the stabilization and stability measurement were performed in the same manner as in Example 1 to measure the color.

The results obtained are shown in Table 4 below.

Table 4

| Example No. | Olefin Polymer Kind | Amount (g) | Treating Agent Kind | Amount (g) | Treating Device | Coloration b-Value | Color |
|---|---|---|---|---|---|---|---|
| Reference Example | Polypropylene | 300 | None | — | Extruder | 6.5 | Yellowish brown |
| Example 19 - (1) | " | 300 | Aluminum tri-isopropoxide | 6 | " | 4.2 | Colorless |
| Example 19 - (2) | " | 300 | 1,4-Dioxane | 6 | " | 4.2 | " |
| Example 19 - (3) | " | 300 | Ethyl acetate | 3.3 | " | 4.5 | Almost Colorless |

EXAMPLE 20-(1) to (5)

Synthesis of Titanium Catalyst Component 40 g of anhydrous magnesium chloride obtained by heat treating the commercially available anhydrous magnesium chloride at 300° C for 5 hours under an argon atmosphere and 12 ml of ethyl benzoate were charged into a 1 liter pot of a vibration mill containing stainless steel (SUS-27) balls having a diameter of 12.7 mm (apparent volume of balls: 800 ml) under an argon atmosphere and the pulverization was conducted for 24 hours under the following conditions: number of vibrations: 1410 per minute and amplitude of vibrations: 3.5 mm. 5 g of the pulverized solids was placed into a 200 ml flask and then 50 ml of dried and degassed n-hexane and 10 ml of $TiCl_4$ were added to react the resulting mixture at reflux temperature for 2 hours. The reaction mixture was washed 10 times with 70 ml of n-hexane by decantation to obtain a solid composition.

50 ml of dried and degassed 1,2-dichloroethane and 0.6 g of trichloroiodine (used by dissolving the trichloroiodine into 1,2-dichloroethane) were added to the solid composition obtained above, and the system was treated at the reflux temperature for 2 hours. After the treatment, the solid was washed 2 times with 70 ml of 1,2-dichloroethane and 3 times with 70 ml of n-hexane to obtain the desired titanium composition. The titanium composition was used for polymerization as a hexane slurry containing about 10% by weight of solids.

The titanium concentration in the titanium composition slurry was calculated colorimetrically using a hydrogen peroxide coloration method and used in the subsequent polymerization.

Polymerization

After drying a 20 l stirring type stainless steel autoclave and replacing the air therein with propylene gas, 15 liters of liquid propylene was added and 410 mg of triethyl aluminum and 6.10 ml of the titanium catalyst component slurry (containing 9.75 mg of titanium atom) were further added to the autoclave. The system was heated to 70° C and polymerization was conducted for 1 hour.

After completion of the polymerization, unreacted propylene was removed by vaporization to obtain 2400 g of powdery polypropylene. The yield of polypropylene per gram of titanium corresponded to 250,000 g, and the total Isotactic Index of the polypropylene was 92%.

Stablization and Stability Measurement 300 g of powdery polypropylene (titanium content: 4 ppm) obtained above was subjected to the stabilization operation and stabilization measurement in the same manner as in Example 2 except that in the extruder, the rotation rate of the screw was 90 rpm, the compression zone temperature was 260° C and the die temperature was 250° C.

The results obtained are shown in Table 5 below.

$(OR)_2$, wherein R represents an alkyl group or an aryl group each having up to 20 carbon atoms.

7. The method as claimed in claim 6, wherein said aluminic ester is an aluminum trialkoxide of the formula $Al(OR)_3$.

8. The method as claimed in claim 1, wherein the concentration of the Ziegler type catalyst component in the polymer ranges from about 1 to about 200 ppm based on the weight of the polymer.

9. The method as claimed in claim 8, wherein the concentration of the Ziegler type catalyst component in the polymer ranges from about 10 to about 100 ppm based on the weight of the polymer.

10. The method as claimed in claim 1, wherein said polymer is a copolymer of propylene with ethylene having an ethylene content of 15 weight percent or less.

11. The method as claimed in claim 6, wherein R represents an alkyl group having 1 to 6 carbon atoms.

Table 5

| Example No. | Olefin Polymer Kind | Amount (g) | Treating Agent Kind | Amount (g) | Treating Device | Coloration b-Value | Color |
|---|---|---|---|---|---|---|---|
| Reference Example | Polypropylene | 300 | None | — | Extruder | 5.6 | Slightly Yellow |
| Example 20 - (1) | " | 300 | Aluminum tri-isopropoxide | 5.0 | " | 4.5 | Almost Colorless |
| Example 20 - (2) | " | 300 | Aluminum tri-octoxide | 3.5 | " | 4.4 | " |
| Example 20 - (3) | " | 300 | Ethyl acetate | 2.8 | " | 4.7 | Slightly colored |
| Example 20 - (4) | " | 300 | Isoamyl propionate | 4.6 | " | 4.7 | " |
| Example 20 - (5) | " | 300 | 1,4-Dioxane | 2.4 | " | 4.9 | " |

While the invention has been described in detail and with reference to specific embodiments thereof, it will be apparent to one skilled in the art that various changes and modifications can be made therein without departing from the spirit and scope thereof.

What is claimed is:

1. A method for stabilizing a polymer selected from the group consisting of a homopolymer or a copolymer of propylene produced by olefin polymerization using a Ziegler type catalyst which comprises treating a polymer selected from the group consisting of a homopolymer or a copolymer of propylene, containing residual catalyst therein, with an aluminic ester as a treating agent.

2. The method as claimed in claim 1, wherein said treating of the polymer and the treating agent is conducted with the polymer in a molten state using an extruder.

3. The method as claimed in claim 2, wherein said treating of the polymer is conducted at a temperature ranging from about 200° to about 270° C.

4. The method as claimed in claim 1, wherein the amount of said treating agent ranges from about 0.01 to about 10% by weight based on the weight of said polymer.

5. The method as claimed in claim 4, wherein said amount ranges from about 0.25 to about 5% by weight based on the weight of said polymer.

6. The method as claimed in claim 1, wherein said aluminic ester treating agent is an aluminum alkoxide represented by the chemical formula $Al(OR)_3$ or $RAl$-

12. The method as claimed in claim 1, wherein said aluminic ester is selected from the group consisting of aluminum trimethoxide, aluminum triethoxide, aluminum tri-n-propoxide, aluminum tri-iso-propoxide, aluminum tri-n-butoxide, aluminum tri-tert-butoxide, aluminum trioctoxide, methyl aluminum dimethoxide, methylaluminum diethoxide, methyl aluminum dipropoxide, methyl aluminum dibutoxide, methyl aluminum dipentoxide, methyl aluminum hexoxide, ethyl aluminum dimethoxide, ethyl aluminum diethoxide, ethyl aluminum dibutoxide, propyl aluminum dimethoxide, propyl aluminum dipropoxide or propyl aluminum dihexoxide.

13. The method as claimed in claim 6, wherein said aluminic ester is an aluminum dialkoxide of the formula $RAl(OR)_2$.

14. The method as claimed in claim 13, wherein said aluminic ester is selected from the group consisting of methyl aluminum demethoxide, methylaluminum diethoxide, methyl aluminum dipropoxide, methyl aluminum dibutoxide, methyl aluminum dipentoxide, methyl aluminum dihexoxide, ethyl aluminum dimethoxide, ethyl aluminum diethoxide, ethyl aluminum dibutoxide, propyl aluminum dimethoxide, propyl aluminum dipropoxide or propyl aluminum dihexoxide.

15. The method as claimed in claim 14, wherein said aluminic ester is selected from the group consisting of aluminum trimethoxide, aluminum triethoxide, aluminum tri-n-propoxide, aluminum tri-iso-propoxide, aluminum tri-n-butoxide, aluminum tri-tert-butoxide or aluminum trioctoxide.

* * * * *